United States Patent [19]
Pearson

[11] Patent Number: 5,859,780
[45] Date of Patent: Jan. 12, 1999

[54] PORTION CONTROLLER

[75] Inventor: Martin Thomas Pearson, Burnaby, Canada

[73] Assignee: Trus Joist MacMillan, a Limited Partnership, Boise, Id.

[21] Appl. No.: 852,210

[22] Filed: May 6, 1997

[51] Int. Cl.[6] .................................................. G06F 19/00
[52] U.S. Cl. ...................... 364/479.1; 222/52; 366/152.1
[58] Field of Search ........................ 364/478.01, 479.01, 364/479.09, 479.1, 479.14, 528; 222/52, 56, 58; 366/131–134, 141, 142, 151.1, 152.1, 152.2, 152.6, 162.1

[56] References Cited

U.S. PATENT DOCUMENTS

| | | | |
|---|---|---|---|
| 4,353,482 | 10/1982 | Tomlinson et al. | 364/479.1 X |
| 4,527,245 | 7/1985 | Axelson, Jr. et al. | 364/479.09 |
| 4,581,704 | 4/1986 | Mitsukawa | 364/479.09 |
| 4,835,701 | 5/1989 | Ohiwa et al. | 364/479.09 |
| 5,240,324 | 8/1993 | Phillips et al. | 364/479.1 |
| 5,341,307 | 8/1994 | Myhre et al. | 364/164 X |

*Primary Examiner*—Joseph Ruggiero
*Attorney, Agent, or Firm*—C. A. Rowley

[57] ABSTRACT

A control for delivery system made up of a plurality of variable output feed sources each with an independently variable input of material defines the capability of each of the feed sources based on the level of material and combines these capabilities to define a total capability of the delivery system. An output setpoint for each source is determined based on its capability and a required setpoint is set based on a desired end product characteristic which is used to define a production rate based on total capacity, required setpoint and the production line characteristics. The process is iterative so that the production rate, e.g. speed of the line is varied iteratively depending on the then current capabilities of the feed sources of the system and the footprint of the feed sources are adjusted based on their sensed capabilities thereby to maximize production line speed based on capability.

13 Claims, 9 Drawing Sheets

といった5,859,780

PORTION CONTROLLER

FIELD OF INVENTION

The present invention relates to a controller, more particularly, the present invention relates to a feed rate controller that controls, for example, line speed with independent variable feed source capabilities to optimize line speed.

BACKGROUND OF THE INVENTION

Production control systems of which Applicant is aware, are not capable of handling independently variable input and output sources, the combined outputs of which determine the production rate for the system.

There are many closed loop control systems, feed forward control systems, feed backward control systems, that sense certain characteristics of the production and feed that information forward or rearward in the process and use the information to control the process or a further step in the process.

BRIEF DESCRIPTION OF THE PRESENT INVENTION

It is an object of the present invention to provide a control system for defining the production rate in a system having a plurality of independent variable sources of material required for the production of the product to be produced and provide automatic optimization of the production line speed.

Broadly, the present invention relates to a control for a delivery system having a plurality of feed sources each of which has a variable output and an independently variable input of material, said control comprising defining capabilities of each feed source of said plurality of feed sources to deliver said material, defining total capacity of said delivery system based on a combination of said capabilities of said feed sources of said plurality of feed sources, defining an output setpoint for each said feed source based on its respective capability as a portion of said total capacity and an input of a required setpoint derived from a desired end product characteristic, defining a production rate based on said total capacity, said output setpoint for each feed source and a characteristic of said delivery system to be controlled, operating said delivery system at said production rate and iteratively redefining said rate and operating said delivery system at a then current defined said rate.

Preferably, said defining capabilities of each said feed source of said plurality of feed sources comprises sensing a potential of each said feed source of said plurality of feed sources to deliver said material and basing its said capability on said potential to deliver material as sensed by said sensing of said potential for each said feed source.

Preferably, each said feed source comprises a bin from which said material is dispensed and said sensing comprises sensing the level of said material in said bin.

Preferably, said control further comprises measuring actual output from each said source to provide a measured actual output for said sources, comparing said measured actual output for each said source with its expected output as defined by its output setpoint, determining error between said expected and actual output of each said source to define an error for each said source and adjusting output rate of each said source based on their respective said defined errors.

Preferably, each said source defines a footprint of material delivered along a length and defining a cumulated output based on said setpoint weighted based on said foot print and using said cumulated output as said expected out in comparing with the actual output from each said source to determine said error.

Broadly, the present invention also relates to a method of weighting flow of material onto a moving accumulator comprising dividing a zone of flow along a path of movement of said accumulator into a plurality of discrete side by side sections, defining an effective rate of flow of said material into each said section, accumulating amounts of such flow into each section into shift registers and shifting each shift register to collect flow from the next adjacent section in the direction of movement at a registered shift command, generating register shift command based on a selected distance of movement of said accumulator giving the rate of movement of said accumulator based on the capability of the system to provide material onto said accumulator and determining the amount of material in each register at each shift command based on said expected rate of flow in each said section and the then current said rate of movement based on said capability in each corresponding section and totalling the amount accumulated in each register leaving said zone.

BRIEF DESCRIPTION OF THE DRAWINGS

Further features, objects and advantages will be evident from the following detailed description of the preferred embodiments of the present invention taken in conjunction with the accompanying drawings in which.

DETAILED OF THE PREFERRED EMBODIMENTS

The present invention will be described in relation to a particular application that is illustrative of various applications to which the present invention may be applied. The particular application to be described is an oriented strand board (OSB) system with orienting heads and strand supply lines.

Figure 1:
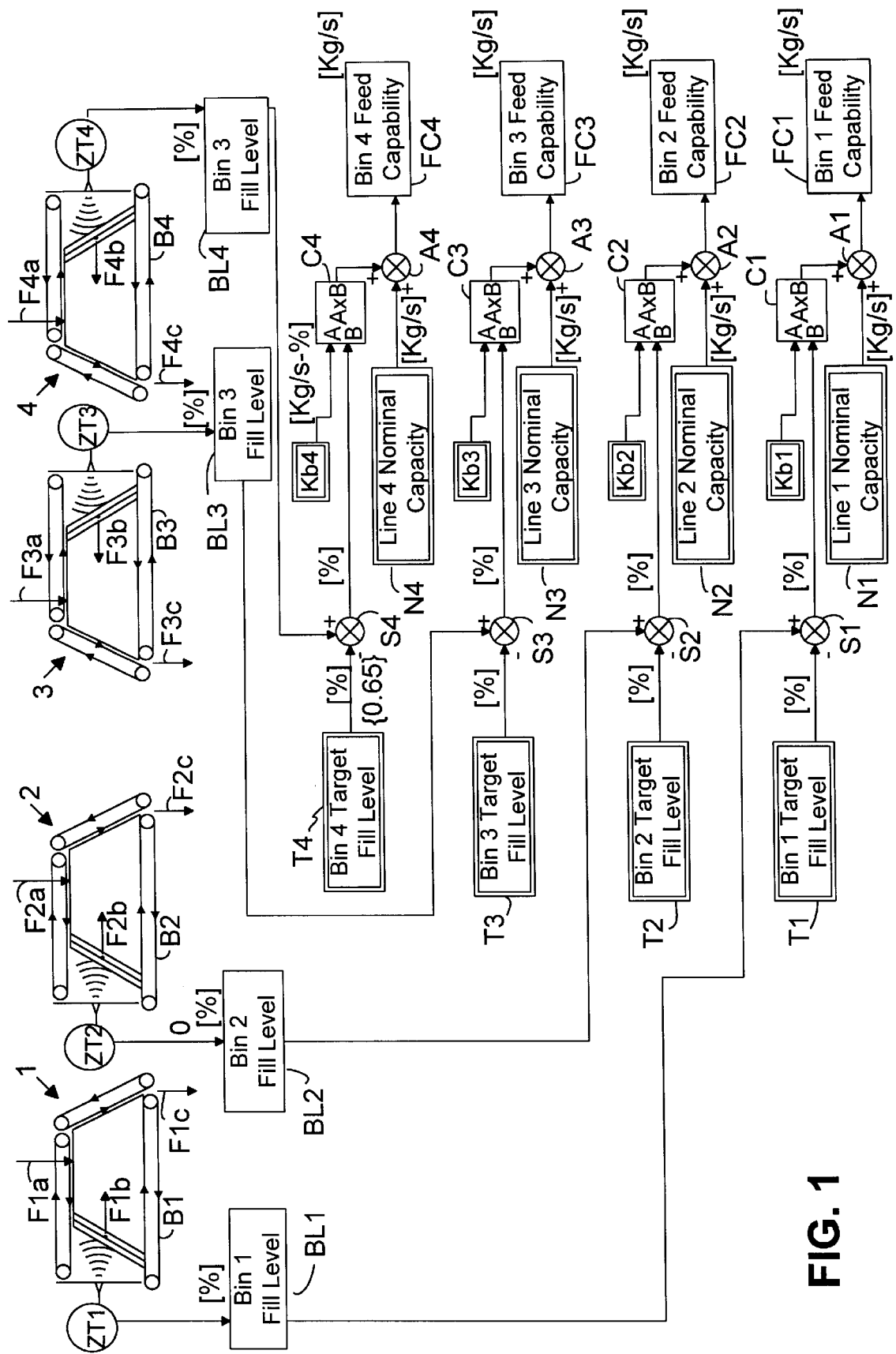
FIG. 1 is a schematic illustration of the bin sensing system for determining bin capacity.

As shown in FIG. 1, the system includes four sources of material (strands) indicated at 1, 2, 3 and 4 from which material is dispensed. Each of these feed sources, 1, 2, 3 and 4 are supplied with material indicated by the arrow F1a, F2a, F3a and F4a. Each of flows F1a, F2a, F3a and F4a is independently variable. These flows determine the production rate of the system and are set to achieve the desired throughput of the system as defined by end product characteristics and desired production rate.

The outputs of the bins or sources 1, 2, 3 and 4 are controlled respectively by the speed of their respective bottom belt B1, B2, B3 or B4 which determine the out flow rate indicated as flow F1c, F2c, F3c, F4c respectively. The difference between the flows F1a and F1c determines the change in level or degree of fullness as indicated by the arrow F1b in bin 1. Similarly, the difference in flow rates F2a, F2c, etc. define the change in flow level as indicated by the arrows in F2b–F4b respectively. The flows F1c, F2c, F3c and F4c are independently variable and vary relative to their respective supply flows F1a, F2a, F3a and F4a.

The level or potential or each of the bins 1, 2, 3 and 4 to deliver material as per flows F1c, F2c, F4c is sensed by a suitable sensor indicated as ZT1, ZT2, ZT3, ZT4 which sense the degree of fullness of their respective bins and determines the bin level as indicated at BL1a, BL2a, BL3a and BL4a respectively.

It will be apparent that the amount of material in a bin defines the potential for that bin to deliver material, i.e. the more material in the bin, the higher the output may be before reducing the volume in the bin below the critical level.

Figure 2:
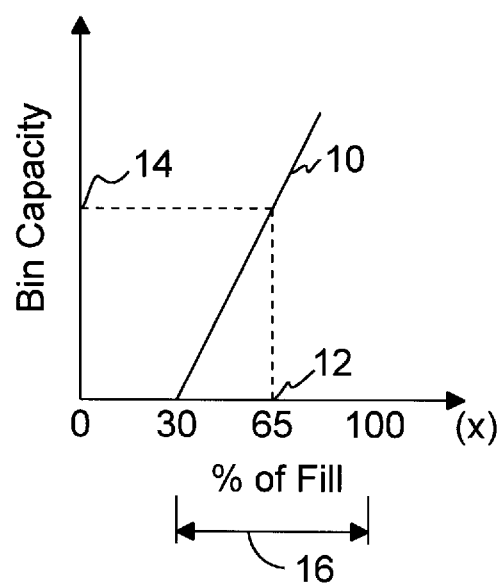
FIG. 2 is a graph indicating method of defining nominal capacity operating rate and source target level.

In order to define these levels, in other words, determine the nominal capacity of the bin and its operating range and to set a target level a minimum fill requirement that is to be maintained is set. In the illustration shown in FIG. 2 the slope of the line 10 which indicates full level in the plot of bin capacity versus percent fill is determined by a selected incremental change and the rate of speed of the bin belts B1 or B2 etc. The curve is shown as a straight line, but will be shaped to match with the source being monitored. In the illustrated arrangement, the target fill level 12 has set at 65% full and the nominal bin capacity 14 is the capacity as indicated on the bin capacity scale at the corresponding point 14 (based again on the range of speeds of the output belts B1, B2, etc.). Thus, for each bin, the nominal capacity 14 corresponds with the target fill level 12 and is based on a selected belt speed positioned between maximum and minimum belt speed. The operating range is defined as indicated at 16 by the minimum fill requirement in percent which, in this example, is set at 30% and the 100% fill level which obviously cannot be exceeded. A change in fill level sensed produces, as will be described below, a suitable change in flow F1c, F2c, F3c and F4c to adjust the level sensed to correspond with nominal or target capacity.

In order to accommodate changes in bin level, each of the bins, 1, 2, 3 and 4 is set within the target fill level 12 as described above and as indicated at T1, T2, T3 and T4 respectively in FIG. 1. The target levels T1, T2, T3 or T4 subtracted from the sensed level or bin fill level for its corresponding bin as indicated by the subtractor S1, S2, S3, S4 respectively.

The resultant percent fill level is then converted in converter C1, C2, C3 and C4 by multiplication with conversion factor indicated as KB1, KB2, KB3, KB4 respectively and fed to an adder A1, A2, A3, A4 respectively, where it is added to a nominal capacity (given in kilograms per second for this example), for the flow as indicated at N1, N2, N3 and N4 respectively (nominal flows 14 for the flows F1c, F2c, F3c and F4c respectively) to produce a bin feed capacity for bins 1, 2, 3 and 4 as indicated at FC1, FC2, FC3 and FC4 respectively. All of these feeds capacities in the example being described, define the capability of each source to output material in weight per unit time, i.e. kilograms per second.

Figure 3:
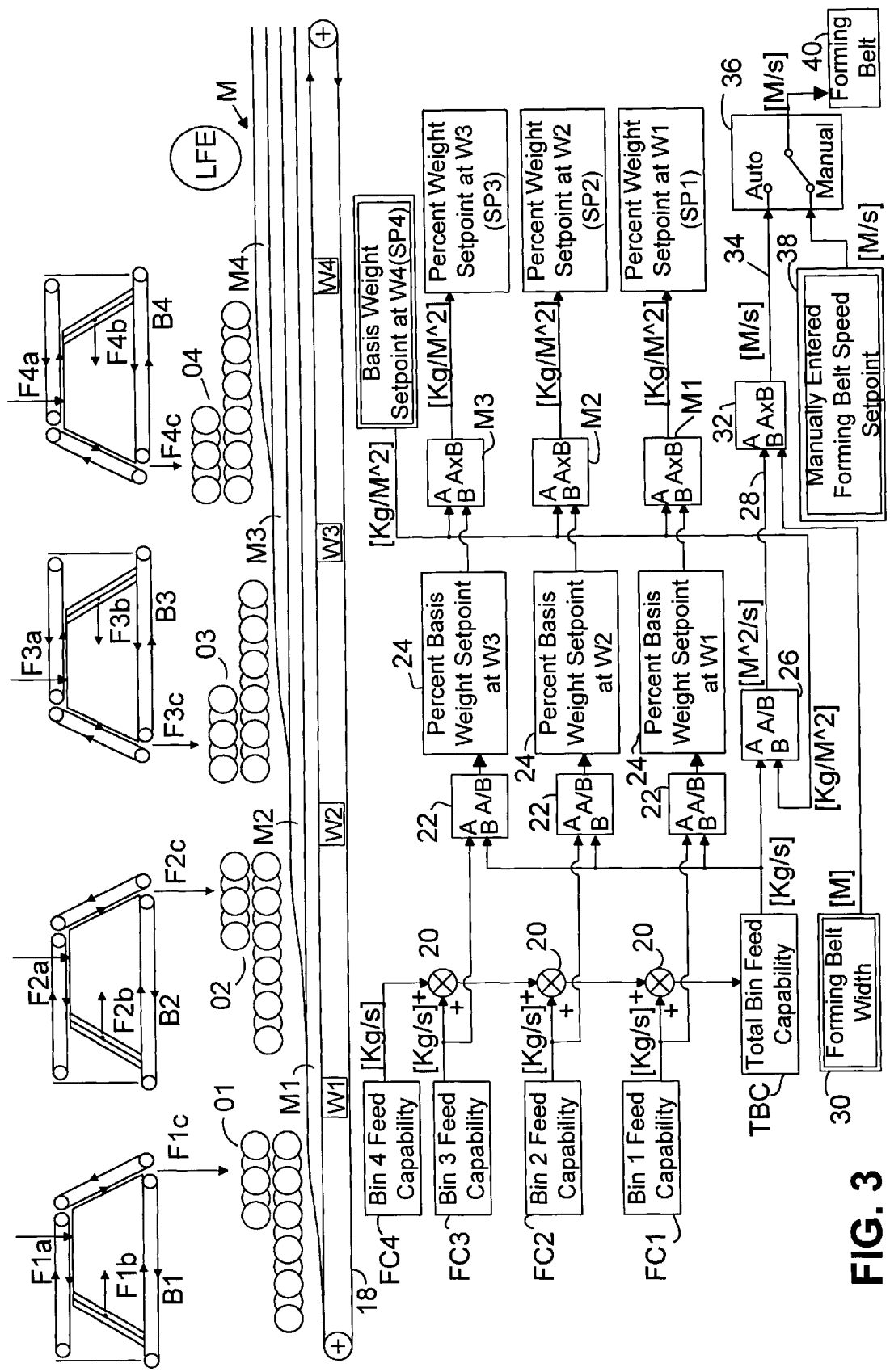
FIG. 3 is a schematic illustration of defining setpoint for each of the sources.
Figure 4A:
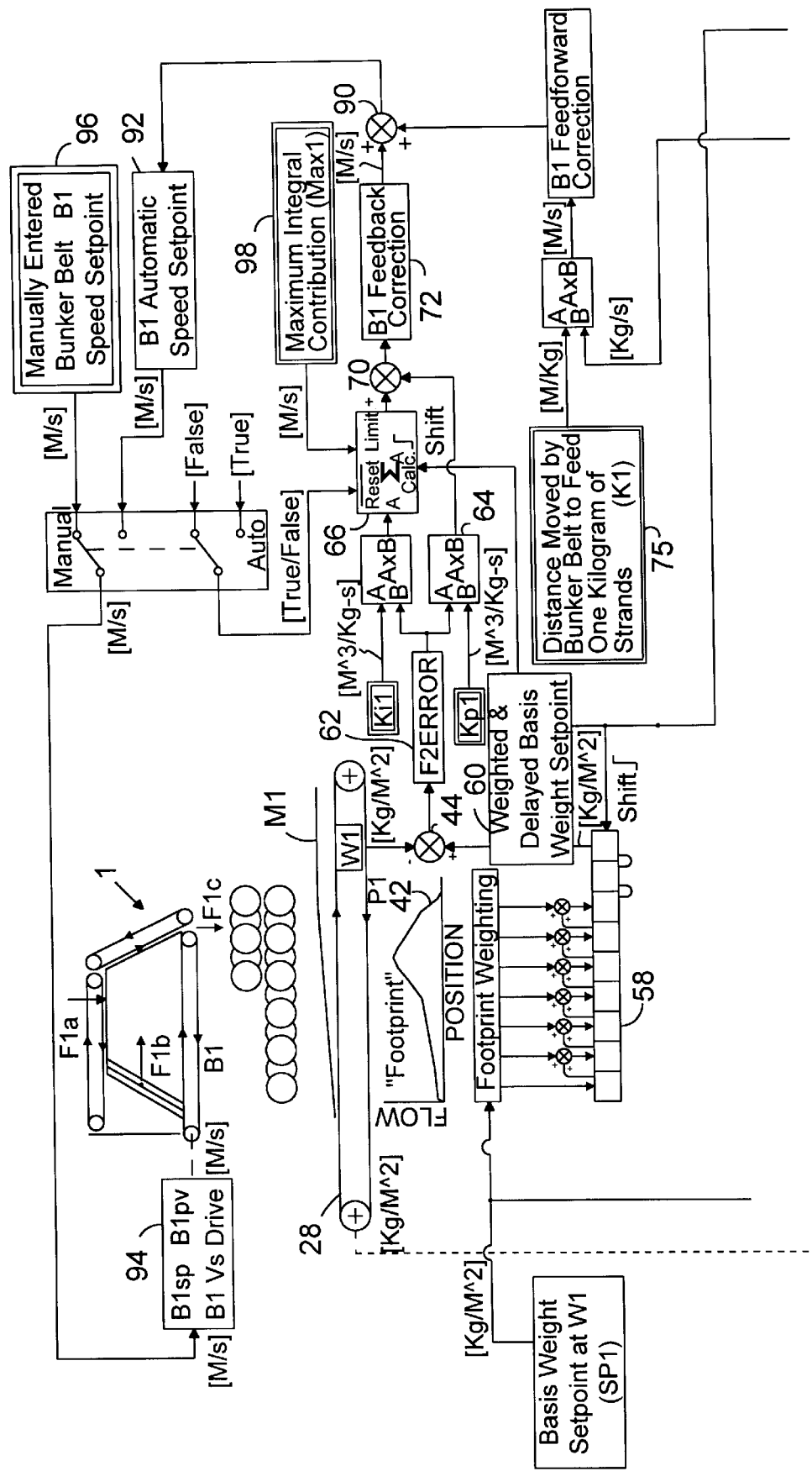
FIG. 4. (formed by FIGS. 5A and 5B) is a schematic illustration of the error correction system based on setpoint (expected value) versus actual (measured value) for the first source in the sequence.
Figure 4B:
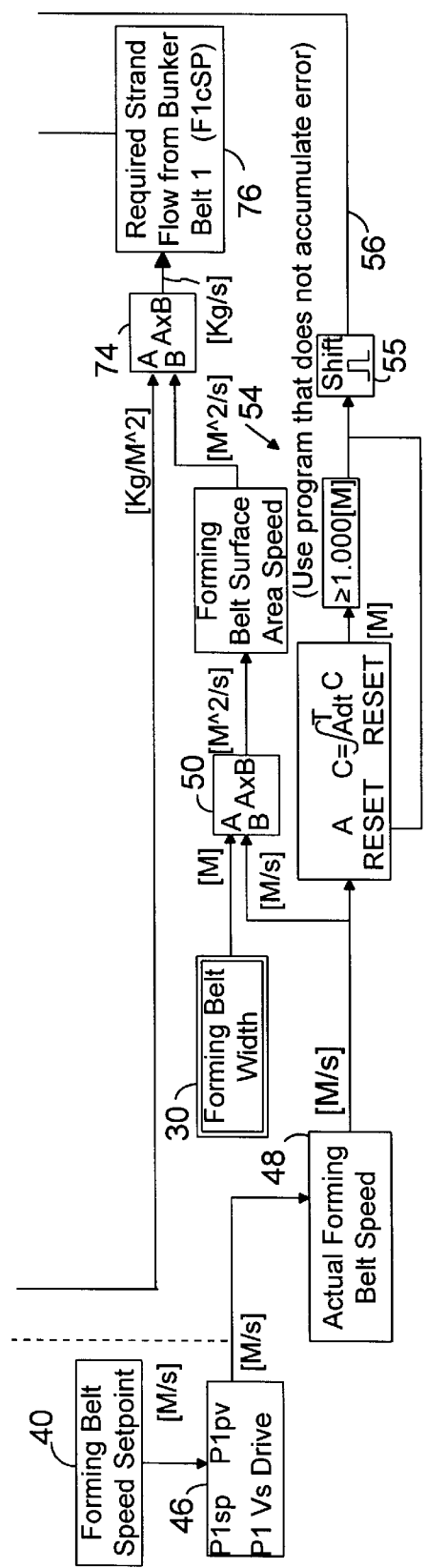
Figure 5A:
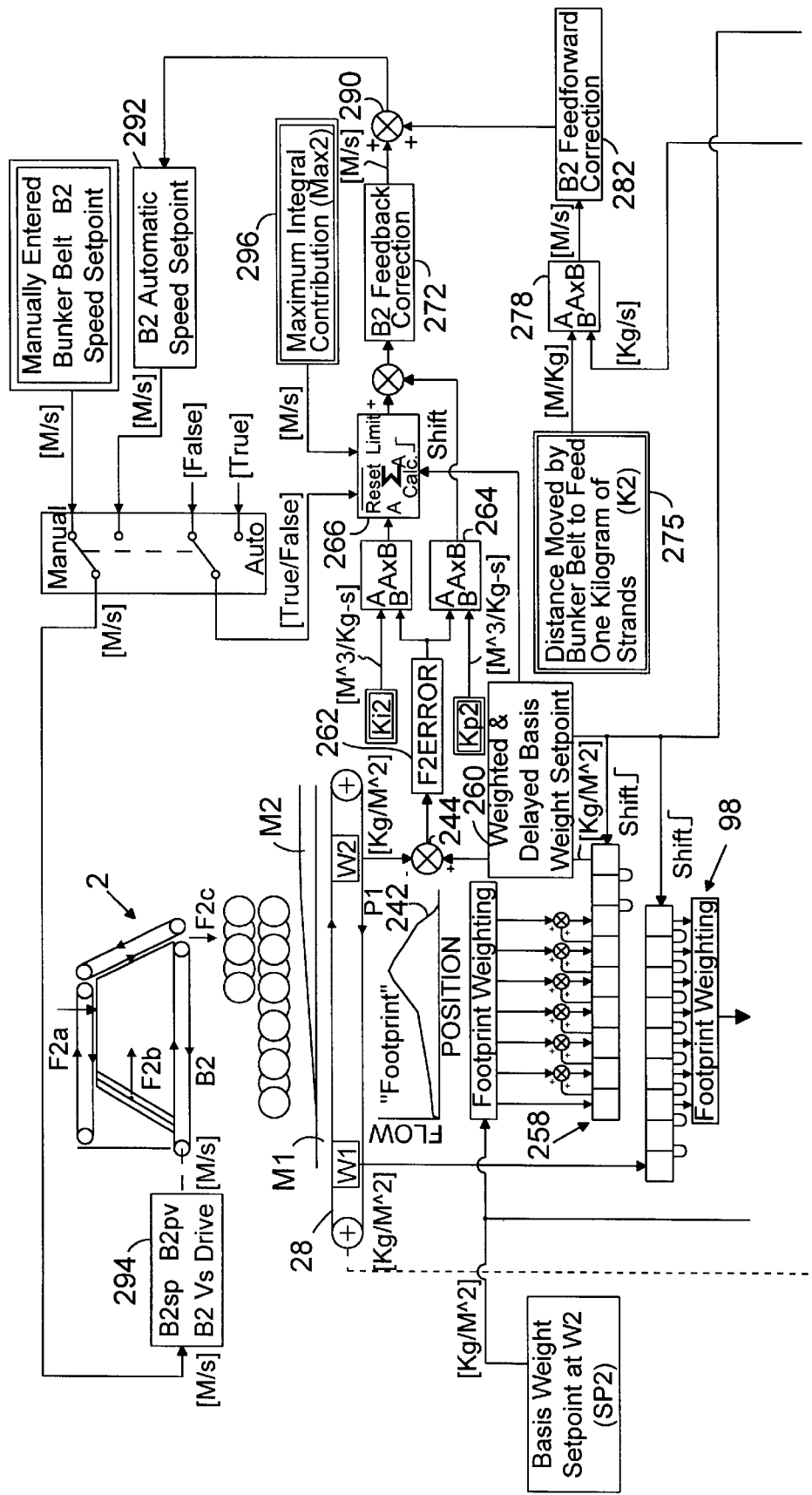
FIG. 5 (formed by FIGS. 5A and 5B) is a schematic illustration similar to FIG. 4 but showing the accumulative effect for subsequent sources in a sequence of sources.
Figure 5B:
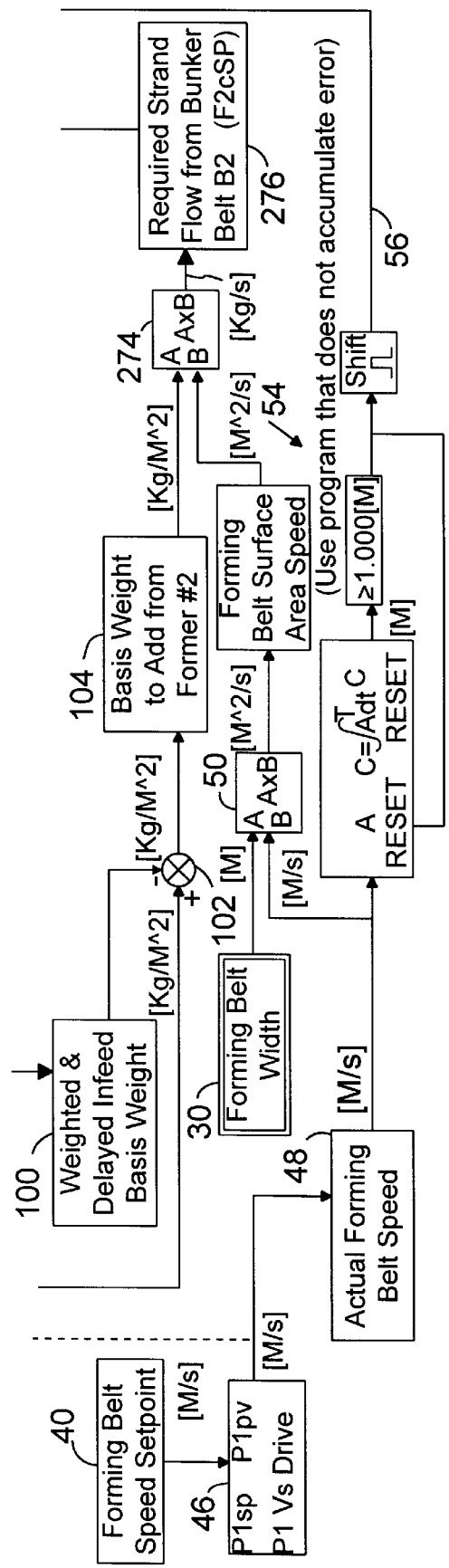

Turning to FIG. 3, as above indicated, the example illustrated is a production system for OSB thus, the outputs F1c, F2c, F3c and F4c from the bins 1, 2, 3 and 4 are fed through an orienter O1, O2, O3 and O4 respectively. In this example, the material within the bins is strands and the flows F1c, F2c, F3c and F4c pass through orienters O1, O2, O3 and O4 respectively which orient the strands and lay them cumulatively on a main forming belt 18 (FIG. 3 and segments of which is shown in FIGS. 4 and 5) as the belt 18 moves past the orienters.

Positioned along the belt 18, one after each of the orienters in the direction of movement of belt 18 is a suitable weighing device designated as W1, W2, W3, W4 respectively for each of the different bins 1, 2, 3 and 4 respectively.

In the next stage in the operation, the bin feed capacities as generated as FC1, FC2, FC3 and FC4 respectively as indicated in FIG. 3, are carried to adders, each of which is indicated by the same reference numeral 20. These adders determine the total capability of the overall system by adding the capacity or capability of bin 4 (FC4) to the capability of bin 3 (FC3) which in turn is added to the capability of FC2 and then to FC1 (i.e. in the illustrated system, there are three adders 20) to produce a total bin feed capacity as indicated at TBC.

Each of the bin feed capacities for the first three bins is then divided by the total capacity in their respective dividers indicated by the reference numeral 22 to provide the percent of basis weight setpoint as indicated at 24 that is expected to be obtained for each of the sources 1, 2 and 3 at each of the respective weight points W1, W2, and W3, i.e. setpoints SP1, SP2, SP3. The percent of setpoint for W4 need not be calculated since the basis weight setpoint for scale W4, i.e. SP4 is the basis weight setpoint of the product to be produced.

The basis for setpoint for source 4 at scale W4 as indicated at SP4 is based on the weight of material (strands) per unit area of the belt 18, e.g. kilograms per meter square, which for this example, is equivalent to the density of the final product assuming that the degree of compression is constant. This value which is preset based on the desired weight (density) of the product is then used, first in the divider 26 to define the area per second available which is carried via line 28 and is then divided in divider 32 by the forming belt 18 width as indicated at 30 to output the number of meters per second the belt 18 travels to collect the total available bin capacity and to generate the required basis weight of the product of the belt 18. This information is fed by line 34 through the switch 36 which permits the operator so select manual entry as indicated at 38 or automatic entry (line 34) of belt forming speed setpoint as indicated at 40.

It will be apparent that the flows from the bins or sources 1, 2, 3 and 4 is dependent on the incoming flows F1a, F2a, F3a and F4a which are devised to provide the required flow rate for the rest of the production system, i.e. to satisfy the press capacity in a composite wood product line.

The basis for the setpoint for each of the bins is determined by multiplying the percent basis weight setpoint in block 24 with the total basis weight in kilograms per meter squared (SP4) for the product in the multiplier's M1, M2 and M3 to provide the basis weight setpoints SP1, SP2, SP3 for each of the bin 1, 2 and 3 respectively with the setpoint for bin or source 4 SP4 being defined by the predefined basis weight of the product to be formed.

Turning now to FIG. 4, the action of the basis weight setpoint SP1 for bin 1, will be discussed. In this illustration, only that section in the forming belt 28 associated with bin 1 has been illustrated.

It is well known that in many orienters, the flow through the orienter is different at different locations along the length of the orienter, hence there is developed a footprint of flow versus position along the orienter as schematically indicated at 42 in FIG. 4 for an orienter. This footprint represents the flow of the material through the orienter at the various points along the length of the orienter, the accumulation of these local flows defines the final weight or desired weight of the layer of mat M1, M2, M3 or M4 being formed by that orienter.

In the illustration, the completed mat is indicated at M and the first layer from source 1 is indicated at M1 in FIG. 4. However, each orienter will add its incremental weight to form the overall mat M as schematically indicated at M2, M3 and M4 for the bins or sources 2, 3 and 4 respectively.

As above indicated, the weight scale W1 measures the weight of mat M1 which is subtracted from the cumulated weight (determined based on setpoint SP1 and footprint 42 as will be described below) in the subtractor 44 to determine error as indicated at 62 and as will be described hereinbelow.

The forming belt speed setpoint 40 determined as above described, is applied to the forming belt drive 46 to define the forming belt 18 speed as indicated at 48, which is then combined with the forming belt width as defined at 30 in the multiplier 50 to provide an output in square meters per second of forming belt 18 i.e. surface area speed as indicated at 52.

Forming belt 18 speed is then summed for a selected time for the belt 18 to travel a selected distance (number of meters) as indicated generally at 54 to generate a shift signal and is then reset to begin counting to define the next shift signal 55. These shift signal 55 are carried via a line 56 and trigger shifting of the basis weight weighting register 58 and the integrator 66 and register 98 to be described below. It will be apparent that other suitable means can be used to generate the shift signal 55. For example, direct measurement of forming belt 18 displacement, for example, by encorders could be used to generate the shift signal every preselected increment of movement of the belt 18.

The basis weight setpoint SP1 is modified based on the footprint weighting system 58 which in turn is defined by the footprint 42 over the time between shift phases so that the weighted input at each increment along the footprint is cumulated to provide a weighted and delayed basis weight setpoint as indicated at 60 (as will be described in more detail hereinbelow). The actual weight W1 is subtracted from the accumulated basis weight setpoint 60 in the subtractor 44 to provide an error measurement 62. This error measurement is then transformed in multiplier 64 based on the conversion KP1 and in multiplier 65 based on the integrated conversion KI1. The output from the multiplication of KI1 with error is integrated at 66 by the shift signal in line 68 which is the same shift signal that is used for weighting the footprint in the footprint weighting system 58. Maximum integral contribution of the integrator 66 is predefined as indicated 98 which when attached during automatic operation resets the integrator 66 at the appropriate time. The output of the multiplier 64 is added to the output of the integrator 66 in adder 70 to provide a feedback correction signal for speed of belt B1 in feeder 1 as indicated at 72.

The basis weight setpoint SP1 is multiplied by the forming belt surface area speed in multiplier 74 to define the required strand flow from the bunker or bin B1 as indicated at 76. This information which is in kilograms per second is then multiplied by the distance moved by the belt B1 to feed 1 kilogram of strands as indicated at 75 in multiplier 78 to generate a feed forward correction as indicated at 80.

The above described feed backward correction determined at 72 and the feed forward correction as determined at 80 are added in the adder to provide an automatic control speed setpoint as indicated at 92 and this speed setpoint is then used to control the drive 94 for the belt B1, thereby the output of bin or source 1.

It will be apparent that the speed of bin 1, i.e. the output belt B1, may be manually controlled as indicated at 96.

The steps indicated in FIG. 4 are repeated for each one of the bins 2, 3, 4 in the manner illustrated in FIG. 5 for bin 2. Thus, only the modification over bin 1 required for bin 2 will be described, that being apparent that similar controls will be provided for bins 3 and 4 in the specific example, The various elements that are essentially the same between the FIGS. 4 and 5, but in FIG. 5 pertained to the second bin have been used with the same numbers except that for bin 2, the numbers are in the 200 series and will not be described.

The system for bin 2 is substantially the same as for bin 1 except that a second footprint weighing system 98 is used to provide a second cumulative and delayed basis weight as indicated at 100 the measured weight W1.

The infeed basis weight 100 is added to the basic weight of point SP2 in adder 102 to provide the basis weight required to be added by former 2 as indicated at 104 which is multiplied in the multiplier 274 to produce the required strand flow from bunker belt B2, i.e. from bin 2 as indicated at 276. This is multiplied by the distance moved by bunker belt B2 required to dispense 1 kilogram of strands as indicated at 275 in multiplier 278 to provide the feed forward correction for belt B2 of bin 2 as indicated at 282 which is used in the same manner as described above for bin 1.

Each of the subsequent bins follow essential the same program as shown in FIG. 5 with the exception that for bin 3, the input to 98 would be the output from the weight scale W2 and for bin 4, the input to 98 would be weight scale W3 etc.

Figure 6:
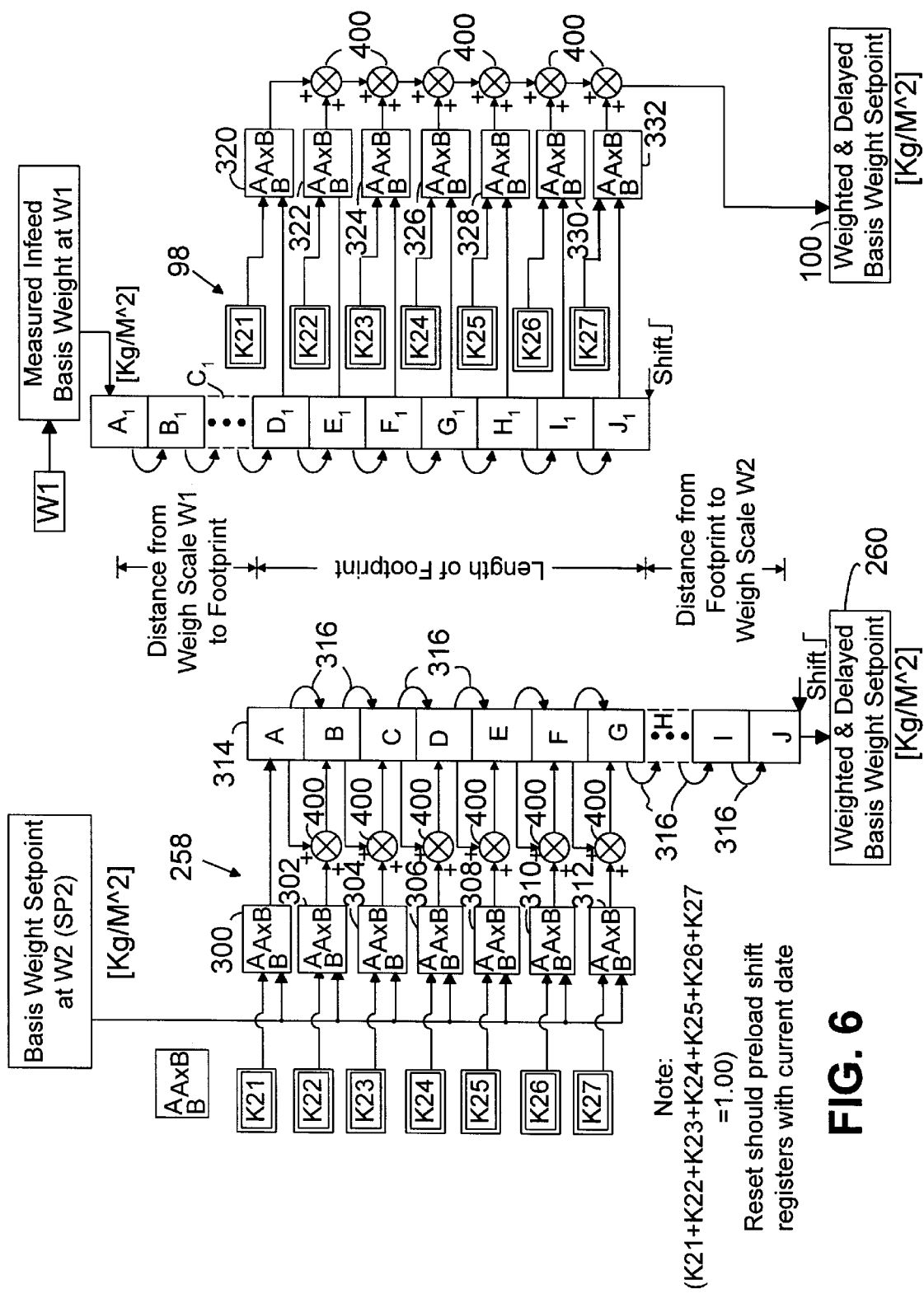
FIG. 6 is a schematic illustration of the setpoint weighting systems for error correction.

In systems where the flow is not uniform along the length over which the material is collected, i.e. the collection zone for the source and the total flow must be determined, the arrangement shown in FIG. 6 is being found to be effective. This figure shows in more detail the arrangement illustrated in FIG. 5 including the shift registers 258 (58) and 98 and the operation and structure of these registers will be described in more detail in conjunction with FIG. 6.

The constants K21 to K27 define the factors generated by the footprint, in FIG. 6, the footprint 242 produced by source 2, i.e, the output for bin 2.

The unit 258 is essentially the same as the unit 58, thus, it will be apparent that the description of 258 also applies to 58 and to the subsequent register units or sources 3 and 4.

In the illustrated arrangement, the basis weight setpoint for weight scale at W2, i.e. SP2 is delivered to each of the multipliers generally indicated by the numbers 300, 302, 304, 306, 308, 310 and 312 into which the constants K21 to 27 respectively are introduced. These constants are determined by the footprint 242 and each is multiplied by the basis weight setpoint SP2 and accumulated in the registers which, for convenience, have been generally indicated at 314. These registers shift downwardly in FIG. 6 as indicated by the arrow 316 at each shift command or signal. Thus, the uppermost register schematically indicated at 316 moves from position A to position B, then from B to C on the next shift command, then from C to D, E to F, etc. on each shift signal. The constants K21 to K27 inclusive are biased based on the footprint 242, i.e. the constants K21 to K27 represent the percent flow into a discrete section of the collection zone. Thus, the total of K21 +K22 +K23 +K24 +K25 +K26 +K27 equals 1, i.e. sum up to 1 as the representative portions of the total flow in that collection zone or represented by that footprint 242.

When the capability to deliver BL1, BL2, BL3, BL4 or any one or more of the sources 1, 2, 3 or 4 changes as above described the basis weight setpoints SP1, SP2, SP3 and SP4 for the sources 1, 2, 3 and 4 change and the velocity of the belt 18 may also be changed which changes the time between shift signals in line 56. The changes in basis weight setpoints are then reflected in the register based on the then current capability.

The registers in the illustrated arrangement continue to shift at each shift signal but are not changed as they move the distant from the footprint to the next adjacent weight scale which, in the illustration, is weight scale no. W2. The weighted and delayed basis weight setpoint 260 so produced is obtained and used to compare with the actual weight W2 to generate a corresponding error signal.

Better control of the output of bin 2 is obtained using a second weighted footprint system indicated at 98 in FIGS. 5 and 6. In this particular arrangement, the actual weight W1 measured at the scale W1 is sequentially inputted into each of the register A1, B1 when they are in the position A1 and then they moved incrementally along the register to the positions B1, C1, D1, etc. on each shift command. When each register in effect reaches the distance from the weight scale W1 to the beginning of the footprint for bin 2, the amounts in the register are weighted by the constants K21 K27 for their various positional increments along the footprint for the bin 2 by multiplication in the respective multipliers 320. The outputs from the multipliers 300 to 312 are totaled by the sensors of adders 400 to provide the total in the registers at each shift which thereby generates the then current weighted and delayed infeed basis weight 100 which is used as above described to determine the then current weight that is needed to be added as indicated at 104 in FIG. 5.

Figure 7:
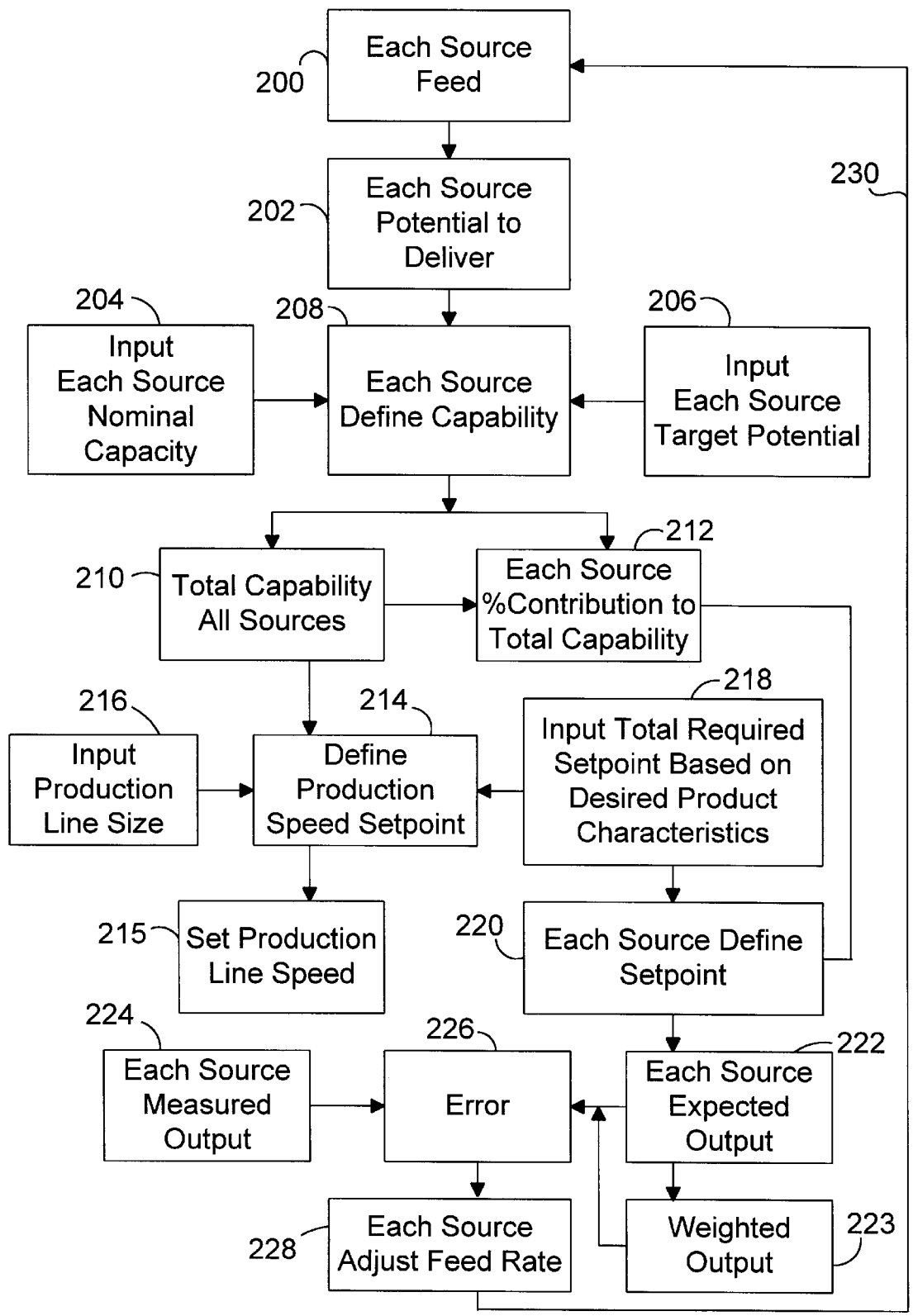
FIG. 7 is a schematic flow diagram illustrating the process of the present invention.

The process and apparatus of the present invention will now be discussed with respect to FIG. 7. As shown, each source feed 200 which would be equivalent to the source feed 1, 2, 3 and 4, above described, is sensed to provide the source potential to deliver material 202 which as above described, is based on the bin level sensed ZT(1), ZT(2), ZT(3) or ZT(4) and is used to define the capability of that source based on bin fill level and the input of the normal capability 14 (N1, N2, N3 or N4) of the respective source and the target potential 12 (T1, T2, T3 or T4) of the respective source, see FIGS. 1 and 2. Thus, the input of nominal capacity is indicated at 204, the input of target potential capability at 206 are used to define the capability of each source as indicated at 208. The capabilities of source are totaled to provide a total capability from all sources as indicated at 210 and this total capability is used with the defined capability for each source in 208 to define the percent contribution of each of the sources to the total as indicated at 212.

The total capability 210 is also used to define the production speed setpoint as indicated at 214 which requires the input of production line size, i.e. in this example, belt width as indicated at 216 and the input of total required setpoint SP4, i.e. i.e. based on basis weight of the desired product as indicated at 218. This sets the protection line speed as indicated at 215, i.e. surface speed of belt 18.

The input 218 of the total required setpoint, i.e. SP4 which is based on the desired product characteristic, is used with percent contribution 212 of each source to define the setpoint for each source as indicated at 220 which in turn then defines the expected output for each source as indicated at 222. The then current expected weight from each source is weighted based on the footprint 42 (242) of the output from the bin or source, i.e. constants K21 to K27 described above to provide a weighted desired or expected weight as indicated at 223.

The measured output of each source, i.e. weights W1, W2, W3, etc. are determined at 224 and the difference between the actual from 224 and the desired or expected from 223 determines the error as indicated at 226 and this error is then used to adjust the feed rate of the respective source 1, 2, 3 or 4 as indicated at 220 and line 230, i.e. the speed of the belts B11 B2, B3 or B4.

The process is done iteratively, i.e. by the computer, i.e. at iteration rate suitable for the particular process, rate of which will be set using conventional practice. Obviously, the iteration rate must be more frequently that the shift signal in line 56.

In a specific application of the present invention, each of the bins or sources 1, 2, 3 and 4 had dimensions as follows: width 103 inches, height 72 inches, length 300 inches, for a volume of 287½ ft$^3$. The packing density of each bin was 26.5 lb/ft$^3$, thus, the total bin capacity was deemed to be 8,368 lb. The mat width m was set at 103 inches, effective width of belt 18 which is same as with the bin and the length of each panel produced was 584 inches. The selected production time per panel was 160 seconds for the target mass density of 4.06 lb/ft$^3$ and the mat production rate of 18.25 ft/min. The normal capacity of each of the bins is 159 lb for a total feed of 636 lb/min. In this example, 1/k1 is 334.75 lb/ft$^3$, B1 feed forward term was 0.475 ft/min and factor k1 was 0.003 lb/ft. These values change from iteration to iteration.

On a trial run on a plant scale, this system has been found to operate significantly better than any other control system that had been tried.

Having described the invention, modifications will be evident to those skilled in the art without departing from the scope of the invention as defined in the appended claims.

We claim:

1. A control method for a delivery system having a plurality of feed sources each of which has a variable output and an independently variable input of material to be delivered by said delivery system, said control method comprising measuring capabilities of each feed source of said plurality of feed sources to deliver said material, defining total capacity of said delivery system based on a combination of said capabilities of said feed sources of said plurality of feed sources, inputting a required total setpoint for said system based on a desired end product characteristic defining an output setpoint for each said feed source based on its respective capability as a portion of said total capacity and said total setpoint for said system to define a source outfeed rate for each said feed source, defining a production rate based on said total capacity, said output setpoint for each feed source and a characteristic of said delivery system to be controlled, operating said delivery system at said production rate and continuously redefining said output setpoint and its said source outfeed rate for each said feed source and operating each said feed source at its currently defined outfeed rate to operate said delivery system at a then current defined said production rate.

2. A control method for a delivery system as defined in claim 1 wherein said measuring capabilities of each said feed source of said plurality of feed sources comprises sensing a potential of each said feed source of said plurality of feed sources to deliver said material and basing its said capability on said potential to deliver material as sensed by said sensing of said potential for each said feed source.

3. A control method for a delivery system as defined in claim 1 wherein each said feed source comprises a bin from which said material is dispensed and said sensing comprises sensing the level of said material in said bin.

4. A control method for a delivery system as defined in claim 2 wherein each said feed source comprises a bin from which said material is dispensed and said sensing comprises sensing the level of said material in said bin.

5. A control method for a delivery system as defined in claim 1 wherein said control further comprises measuring actual output from each said source to provide a measured actual output for said sources, comparing said measured actual output for each said source with its expected output as defined by its output setpoint, determining error between said expected and actual output of each said source to define an error for each said source and adjusting output rate of each said source based on their respective said defined errors.

6. A control method for a delivery system as defined in claim 5 wherein each said source defines a footprint of material delivered along a length and defining a cumulated output based on said setpoint weighted based on said foot print and using said cumulated output as said expected output in comparing with the actual output from each said source to determine said error.

7. A control method for a delivery system as defined in claim 2 wherein said control further comprises measuring actual output from each said source to provide a measured actual output for said sources, comparing said measured actual output for each said source with its expected output as defined by its output setpoint, determining error between said expected and actual output of each said source to define an error for each said source and adjusting output rate of each said source based on their respective said defined errors.

8. A control method for a delivery system as defined in claim 7 wherein each said source defines a footprint of material delivered along a length and defining a cumulated output based on said setpoint weighted based on said foot print and using said cumulated output as said expected output in comparing with the actual output from each said source to determine said error.

9. A control method for a delivery system as defined in claim 3 wherein said control further comprises measuring actual output from each said source to provide a measured actual output for said sources, comparing said measured actual output for each said source with its expected output as defined by its output setpoint, determining error between said expected and actual output of each said source to define an error for each said source and adjusting output rate of each said source based on their respective said defined errors.

10. A control method for a delivery system as defined in claim 9 wherein each said source defines a footprint of material delivered along a length and defining a cumulated output based on said setpoint weighted based on said foot print and using said cumulated output as said expected out in comparing with the actual output from each said source to determine said error.

11. A control method for a delivery system as defined in claim 4 wherein said control further comprises measuring actual output from each said source to provide a measured actual output for said sources, comparing said measured actual output for each said source with its expected output as defined by its output setpoint, determining error between said expected and actual output of each said source to define an error for each said source and adjusting output rate of each said source based on their respective said defined errors.

12. A control method for a delivery system as defined in claim 11 wherein each said source defines a footprint of material delivered along a length and defining a cumulated output based on said setpoint weighted based on said foot print and using said cumulated output as said expected out in comparing with the actual output from each said source to determine said error.

13. A method of weighting flow of material onto a moving accumulator comprising dividing a zone of flow along a path of movement of said accumulator into a plurality of discrete side by side sections, defining an effective rate of flow of said material into each said section, accumulating amounts of such flow into each section into shift registers and shifting each shift register to collect flow from the next adjacent section in the direction of movement at a registered shift command, generating register shift command based on a selected distance of movement of said accumulator giving the rate of movement of said accumulator based on the capability of the system to provide material onto said accumulator and determining the amount of material in each register at each shift command based on said expected rate of flow in each said section and the then current said rate of movement based on said capability in each corresponding section and totalling the amount accumulated in each register leaving said zone.

* * * * *